(No Model.)  3 Sheets—Sheet 1.

W. A. McCOOL.
TUBE DRAWING MACHINE.

No. 600,013.  Patented Mar. 1, 1898.

Witnesses  
Wm. H. Edwards  
Arthur L. Bryant

Inventor  
William A. McCool  
By H. T. Bliss, atty.

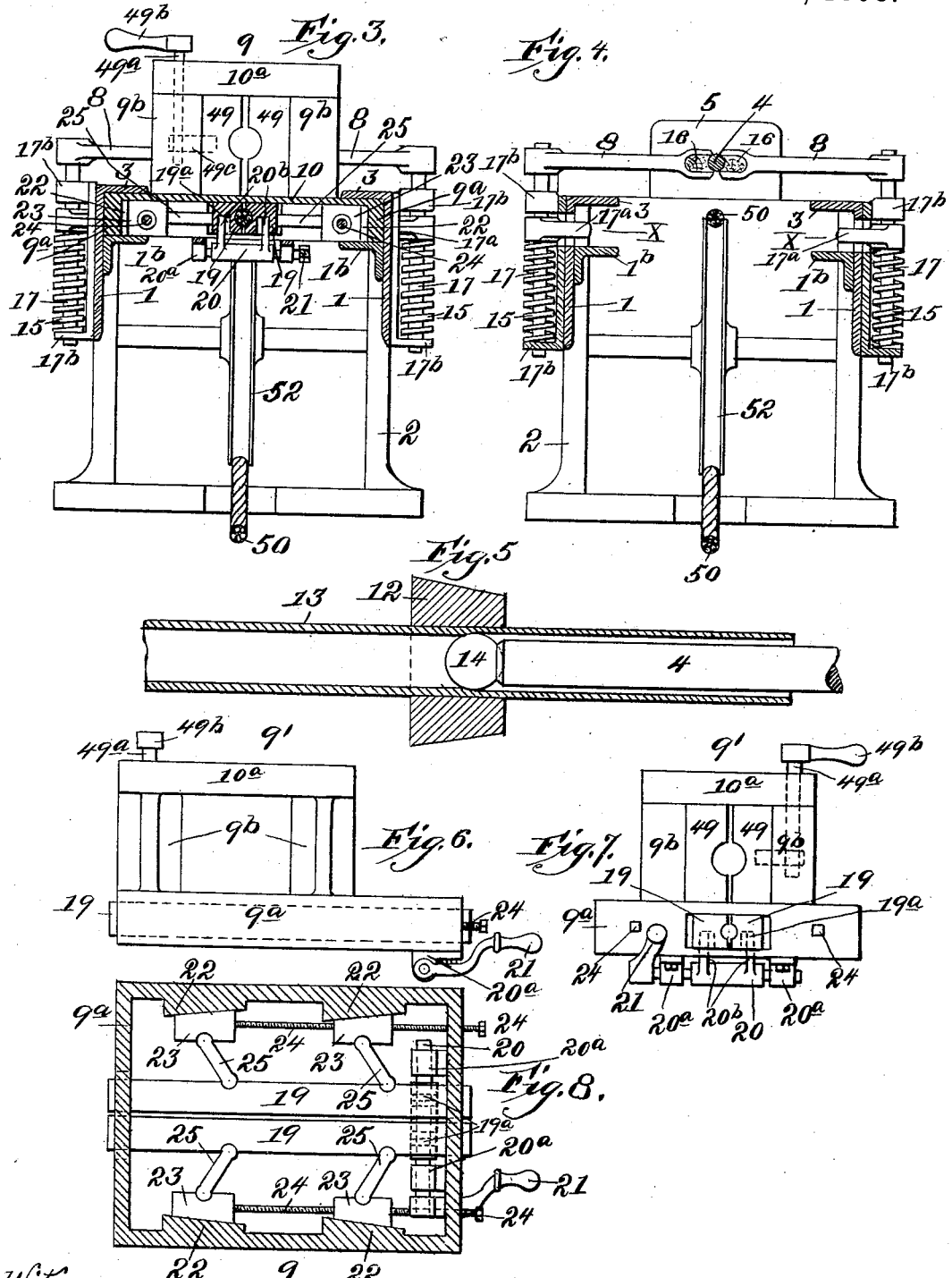

(No Model.) 3 Sheets—Sheet 3.
W. A. McCOOL.
TUBE DRAWING MACHINE.
No. 600,013. Patented Mar. 1, 1898.
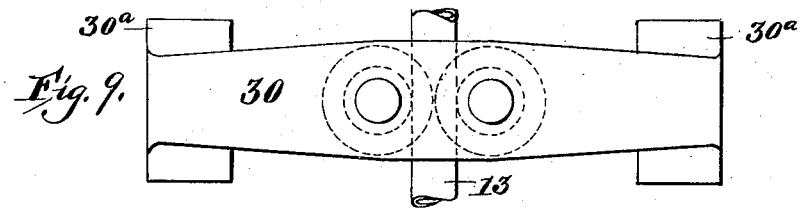
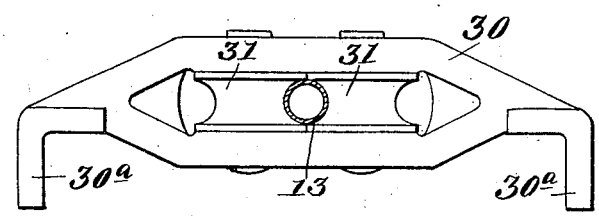
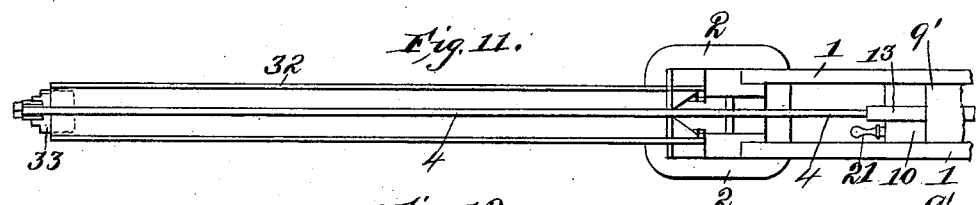
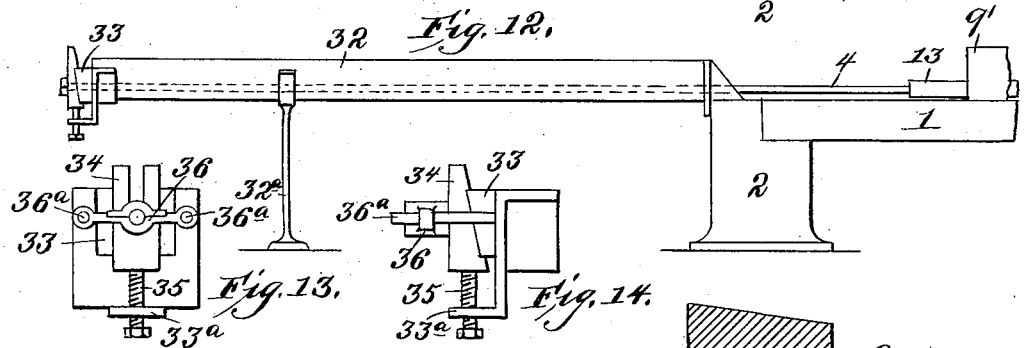
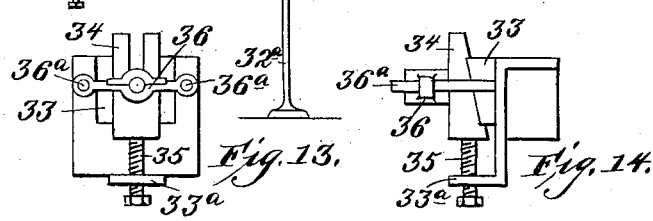
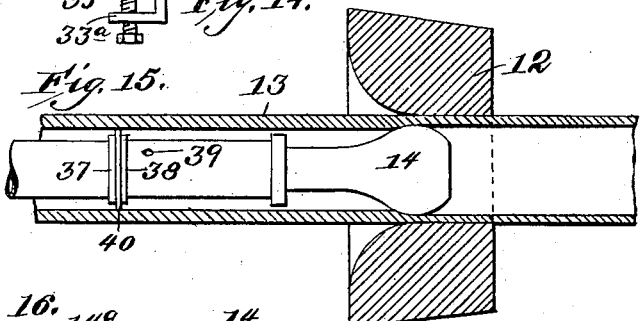
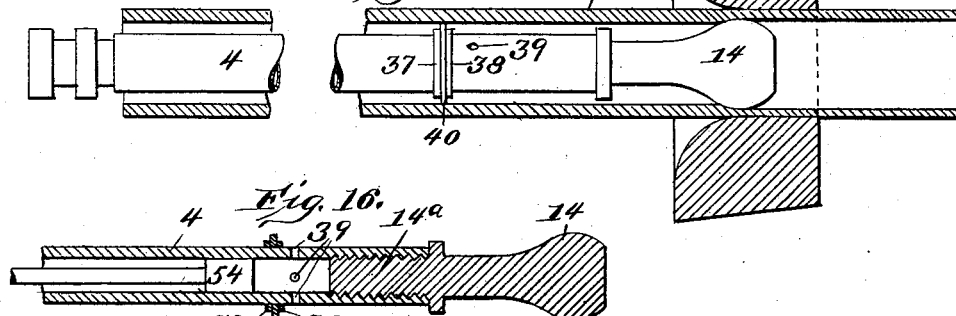
Witnesses
Wm. H. Edwards
Arthur L. Bryant
Inventor
William A. McCool
By J. H. Bliss
Atty.
THE NORRIS PETERS CO., PHOTO-LITHO., WASHINGTON, D. C.

UNITED STATES PATENT OFFICE.

WILLIAM A. McCOOL, OF BEAVER FALLS, PENNSYLVANIA.

TUBE-DRAWING MACHINE.

SPECIFICATION forming part of Letters Patent No. 600,013, dated March 1, 1898.

Application filed September 12, 1896. Serial No. 605,657. (No model.) Patented in England November 14, 1896, No. 25,686; in France September 14, 1897, No. 270,462, and in Belgium September 24, 1897, No. 130,827.

*To all whom it may concern:*

Be it known that I, WILLIAM A. McCOOL, a citizen of the United States, residing at Beaver Falls, in the county of Beaver and State of Pennsylvania, have invented certain new and useful Improvements in Tube-Drawing Machines, (for all or parts whereof there have been issued to me in the Kingdom of Great Britain and Ireland Letters Patent No. 25,686, dated November 14, 1896; in France Letters Patent No. 270,462, dated September 14, 1897, and in the Kingdom of Belgium Letters Patent No. 130,827, dated September 24, 1897;) and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
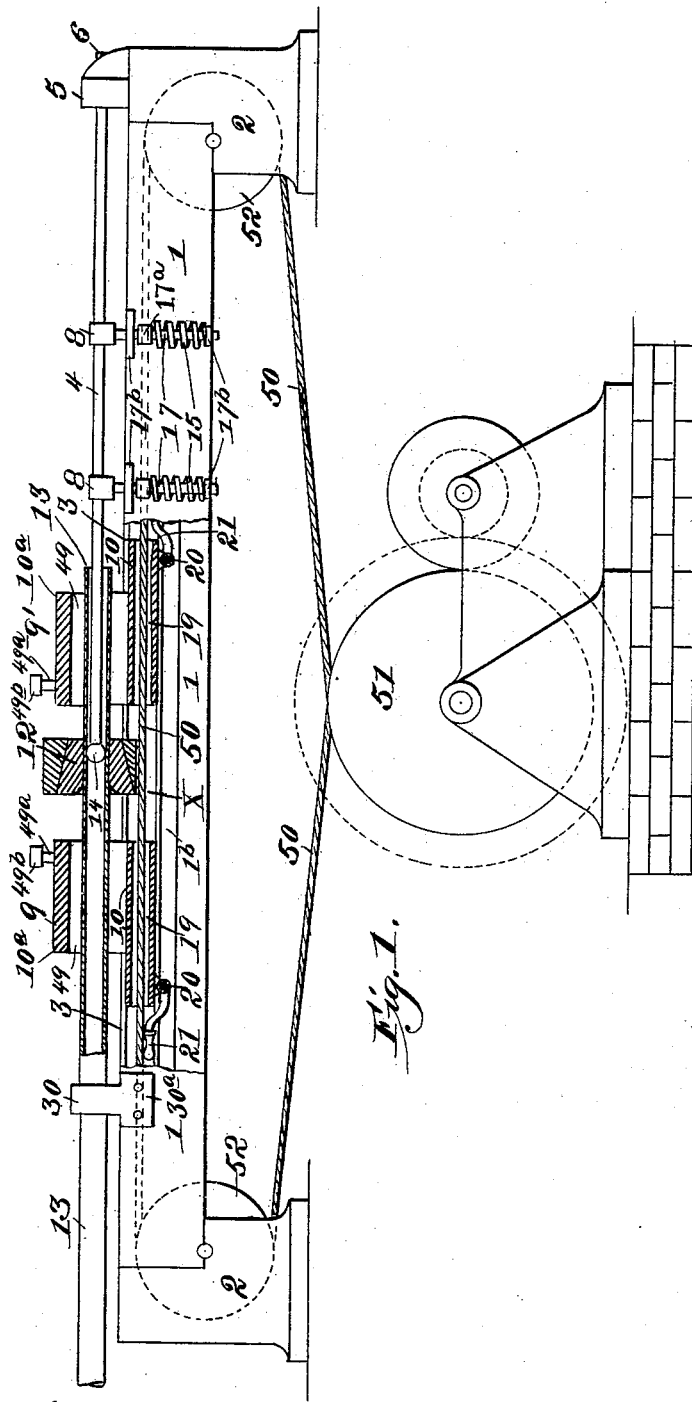
Figure 2:
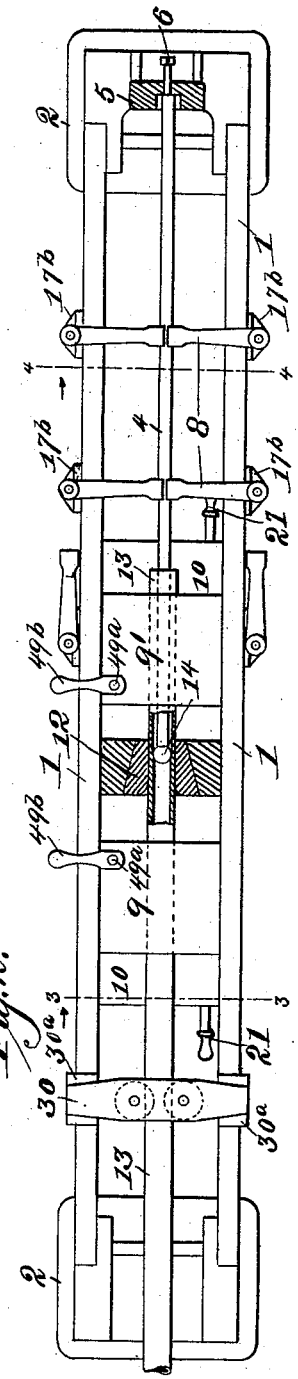

Figure 1 is a side elevation, partly in section, of a tube-drawing machine embodying my improvements. Fig. 2 is a top plan view. Fig. 3 is a sectional view on the line 3 3 of Fig. 2. Fig. 4 is a similar view on the line 4 4 of Fig. 2. Fig. 5 is a detail view of a portion of a mandrel. Figs. 6 and 7 are respectively a side elevation and an end elevation of the movable tube carriage or head 9', and Fig. 8 is a plan view of the devices for connecting the tube-carriage 9 to the propelling-cable. Figs. 9 and 10 are respectively a plan and an end elevation of a tube-guide. Figs. 11 and 12 are a plan and a side elevation of an extended support for the mandrel. Figs. 13 and 14 are enlarged detail views of the means employed for supporting the outer end of the mandrel in the form of machine 11 and 12. Fig. 15 is a longitudinal sectional view through a tube, showing a modified form of mandrel in place therein. Fig. 16 is a longitudinal sectional view of the mandrel illustrated in Fig. 15.

I have found that when tubing is being drawn on the bench it is very desirable to apply the longitudinal propelling force to the tube by mechanism capable of more or less yielding, so that the propulsion shall not be absolutely positive and fixed at all times, but such as to allow slight checks in the advance, the result being to permit the metal to more gradually flow at those instants when extraordinary resistance is experienced. For this purpose a frictional engagement of two of the driving or propelling devices is advantageous—as, for instance, by employing a driving-drum with a chain or cable wrapped around it.

Another matter of importance is to have the tube-propelling mechanism comprise two parts which can be brought into engagement at any transverse line—as, for instance, by having a cable or chain of uniform cross-section throughout its entire length and a gripper adapted to be quickly connected thereto at any point. This is in contradistinction to the plan commonly followed of drawing the tube by means of a hook or pin and a chain which can only engage with the hook at certain points separated by relatively large intervals.

In general features the present mechanism is analogous to that shown and described in my earlier application, Serial No. 571,476, filed December 9, 1895; but it differs therefrom in important particulars, which will be hereinafter pointed out and described.

In the drawings, 1 1 designate the side rails of the bed or support of the apparatus, which rails are mounted at their ends upon suitable pedestals or standards 2 2. As shown, the rails or side bars 1 are preferably formed of angle-iron, each having at its upper edge a horizontal inwardly-extending flange 3. To the inner faces of said bars 1 are secured angle-irons $1^b$, the upper horizontal flanges of which extend parallel to the flanges 3, thus forming a guideway X along the inner side of each bed-bar 1.

12 designates a stationary circular die rigidly secured to the side bars 1 1 at an intermediate point of their length. This die may be constructed in any preferred and well-known manner.

In the ways or guides X are fitted the carriages or movable tube-grippers 9 9', by which the tube is moved longitudinally of the bed and through the circular die 12. As shown, these carriages are arranged on opposite sides of said die, and each is provided with means for detachably engaging the tube to be drawn and with means for engaging with the power-propelling cable. In the drawings each of said carriages or movable tube-grippers comprises a rectangular-shaped base 9ª, the longitudinal sides of which are adapted to fit within the aforesaid guides on the bed. The said base 9ª preferably has a top plate 10, and to said base are secured or formed integral therewith upwardly-extending side plates 9ᵇ, which are connected by a top piece or cap-plate 10ª. The clamping blocks or jaws 49 of the tube-gripping devices are shown as being supported on the base 9ª between the side plates 9ᵇ, each of said jaws having formed in its inner face a longitudinally-extending semicircular groove or recess adapted to receive a portion of the tube 13 to be drawn. One of said clamping-blocks is adapted to be moved laterally toward and from a companion block to release or grasp the tube 13. Preferably such movement is controlled through a short vertical shaft 49ª, mounted in the carriage and provided at its upper end with an operative crank 49ᵇ and at its lower end with a link or finger 49ᶜ, which is connected with the movable block 49.

50 designates an endless rope or cable which passes around a suitable driving-drum 51, and after passing around guiding wheels or drums 52, journaled in the pedestals or standards 2, extends longitudinally of the bed of the apparatus in line with the cable-gripping jaws of said movable heads 9 9'. Each carriage 9 9' is, as said above, provided with means for attachment to said endless rope or cable, whereby said carriage and the tube 13, when gripped by the jaws 49, may be moved longitudinally and the tube forced or drawn through the die 12.

In the embodiment of my invention herein illustrated I have shown the base 9ª of each carriage as provided on the inner faces of its side bars with integral inwardly-extending inclined surfaces 22 and coacting cam or wedge blocks 23, there being two of such blocks on each side of the carriage, separated so as to lie in the plane of and contact with the adjacent inclined surfaces 22. As shown, the two wedge-blocks 23 at each side of the carriage are connected by a threaded shaft 24, one end of which projects beyond the end of the carriage. By operating either shaft 24 the cams 23, connected therewith, may be moved longitudinally of the carriage and their inner faces moved toward or from the center longitudinal line of the carriage.

19 19 designate the cable-gripping jaws, which extend through openings in the end walls of the carriage-base and are arranged on opposite sides of the path of the cable 50.

Various devices may be employed for forcing the cable-gripping jaws into such position that the carriage will be connected with the cable and caused to move longitudinally of the machine. At present I prefer to employ devices by which the pull exerted by the cable or tension device will act to more firmly connect the carriage to said propelling means, and means by which said devices can be actuated to instantly release the cable—that is, in the embodiment of my invention herein illustrated the jaws 19 are connected with the cams 23 by toggle-links or short rods 25, having enlarged ends which are seated in suitable sockets or recesses formed in said jaws and cams.

From the above description and the drawings it will be seen that the jaws 19 if moved longitudinally will be simultaneously, through the action of the links 25, moved toward or from the cable 50, according to the direction of the longitudinal movement. To effect this gripping or releasing of the cable, I employ a shaft 20, extending transversely of the carriage, it being journaled in suitable bearings 20ª, depending from the base-frame 9ª and being provided at one end with an operating crank or handle 21. This shaft 20 is provided at points between the journals 20ª with two upwardly-extending lugs 20ᵇ, which extend into sockets 19ª, formed in the cable-gripping jaws 19. By operating the shaft 20 each of the jaws 19 can be instantly forced toward the other to grip the cable 50, and the strain or pull exerted by the cable tends to clamp the jaws more firmly thereto. The handle 21 for controlling the movements of the cable-gripping jaws 49 may, as shown in the drawings, be arranged at either side of the carriage or movable head. Thus in Fig. 2 the said handle is shown as situated at or near the opposite longitudinal side of the movable tube-gripper from the handle 49ᵇ, by which the movable jaw 49 of the tube-clamp is actuated; but in Fig. 8 it will be noticed that the handle 21 and the rock-shaft which it operates are so arranged that said handle is on or adjacent to the same longitudinal side of the movable gripper as the said handle 49ᵇ. This arrangement is advantageous in that it brings both of the handles relatively close together and into easy reach of an operator at one side of the machine. By disengaging said handle and operating the shaft in the opposite direction said jaws can be moved away from each other and the carriage or tube-gripper released from the cable.

For the purpose of guiding the tube 13 to be drawn to the mandrel and die 12 I preferably employ a yoke-shaped guide 30. This guide is provided with side flanges 30ª, adapted to be supported on the bed-bars 1, and within an aperture formed therein are mounted two peripherally-grooved guide-wheels 31, between which the tube 13 passes.

4 designates the mandrel, which may be of any suitable style and construction. Preferably it is supported at one end in a tailpiece 5 and connected with an adjusting-screw 6. For holding the mandrel in a straight line throughout its length I employ a series of swinging arms or holders adapted to be automatically moved out of the path of the carriage 9' as the same is moved longitudinally of the mandrel and to reëngage with the tube after the said carriage has passed. Each of these movable holders comprises a vertical shaft 17, mounted in a bearing 17$^b$, projected laterally from the side or bed rails 1 and provided at its upper end with an arm 8, adapted to extend inwardly over the bed-frame and engage with the mandrel 4. The free end of the arm 8 is cut away to provide a groove or socket, in which is fitted a wearing-block 16. The vertical shaft 17 is normally held in such position as to cause the arm 8 thereof to contact with the mandrel by means of a coiled spring 15, fitted around the lower portion of and having one end connected to said shaft and its other end connected to or abutting against the side bar 1 of the machine. To the shaft 17 at an intermediate point of its length is rigidly connected a finger or lug 17$^a$, the free end of which projects through a slot or aperture formed in the side bar 1 in line with the way or groove X. As the carriage 9' moves longitudinally along the way X the base 9$^a$ thereof will contact with the finger or stud 17$^a$ and force the same outwardly through the slot or aperture in the bed-bar, thus turning the vertical shaft 17 and moving the arm 8 thereof to a point beyond the side lines of the bed and out of the path of said carriage.

In Figs. 11 to 14 I have illustrated a slightly-modified construction specially designed and adapted for the handling of long tubes. In this construction a V-shaped trough 32 is secured to the base 2 instead of the thrust-block 5, and the outer end of such trough is supported by a post or upright 32$^a$. The outer end of this trough is closed by a thrust-block 33, having a centrally-arranged vertical slot formed therein, through which the mandrel 4 passes. The outer end of this mandrel is secured in a cross-head 36, mounted upon parallel rods 36$^a$, projecting from the trough 32. The rear face of the thrust-block 33 is inclined or provided with a slot having a cam-like surface, and into said slot projects a block 34, having its forward face or surface inclined. To the lower side of this block 34 is connected an adjusting-screw 35, which extends through a stationary depending bracket 33$^a$ on the thrust-block 33. By means of this screw 35 the outer end of the mandrel can be adjusted vertically as may be desired.

The above-described apparatus may be employed to draw tubing either by first passing the tube through the stationary die 12 and then over the mandrel or by placing such tube on the mandrel and drawing it therefrom through said stationary die. In case the first method is followed I prefer to employ the form of mandrel illustrated in Fig. 5, in which a slight cavity is formed at the free end of the mandrel, into which projects a small portion of a ball 14. The ball 14 is free to rotate in any direction and operates to constantly present a different and true surface to any particular part of the die.

If the second of the above-described methods is followed, I prefer to secure the ball 14 rigidly to the end of the mandrel, as in Figs. 15 and 16. Referring to said figures, it will be seen that the mandrel is formed of a hollow tube and that the ball 14 is carried by a threaded stem 14$^a$, adapted to be screwed into one end of the mandrel. I also prefer to form on the mandrel two collars 37 38, between which is clamped a yielding cup-shaped washer 40, adapted to contact with the inner surface of the tube 13.

39 designates an aperture or passage extending through the walls of the mandrel, by means of which suitable lubricant can be permitted to pass from the interior of the mandrel to the outer surface thereof. As one means of positively forcing lubricant through such passage a plunger 54 may be arranged within the mandrel, as indicated in the drawings.

The mechanism above described is used as follows: The die 12 is properly placed and the mandrel is adjusted so that its head 14 is in proper position relative to the die. If the tube is to be compressed from the exterior only, the mandrel can be temporarily withdrawn, and vice versa. When the parts are in position, a tube 13 is pushed through the space between the guide-rollers 31, and its front end is passed to a point somewhat in front of the carriage or tube-gripper 9, the latter being at this time disengaged both from the cable 50 and from the tube. When the tube is properly placed, the handle 49$^b$ is moved, so as to cause the block 49 to move to tightly grip the tube, and then the lever 21 is moved, so as to cause the arms 20$^b$ to start the cable-gripping jaws 19 to move toward the cable, and as soon as the latter is touched by them its frictional contact tends to draw them toward each other and more tightly grip the cable. Thus a great power is exerted for connecting the carriage and the cable together. As soon as the carriage 9 is thus caught by the cable the latter forces it and the tube toward the die 12, the tube projecting a short distance in front of the carriage. The propelling of the tube continues until its forward end has passed through the die far enough to permit it to be connected to the carriage 9'. Then the carriage 9 is released from the cable and from the tube. After this the carriage 9' is, by means of its movable block and handle 49$^b$, clamped to the tube, and by means of the lever 21 and the toggle-gripping bars 19 it is connected to the cable. After the occurrence of the latter the carriage 9' commences to move with the cable and to draw the tube through the die.

If an interior mandrel is in use, its stem 4 is supported in alinement, as aforesaid, by the arms 8, and as the carriage 9' reaches the pairs of arms they are moved, as above described, to permit the passage of the carriage. If at any time it is desired to obtain a new grip upon the tube at points farther back from its forward end, the carriage 9' is released from the cable and from the tube and pushed by hand or otherwise backward to a position near the die, after which it is again clamped to the tube and cable and the drawing continued. Should it be desired to propel the tube from both sides of the die—that is, to impart both a pushing and a pulling action—both carriages can be clamped to the cable and the tube.

As the cable 50 is merely wrapped around the drum 51, the latter imparts its motion by frictional contact and not by positive engagement, such as that of gear-teeth. Hence if at any time there should be very extraordinary resistance or strain experienced there can be more or less of a slip or yielding.

Again, by using a wire cable I make additional provision for yielding of the carriages or propelling devices, as the cable will by reason of its elasticity permit more or less of such yielding. Consequently I have found that the metal can be treated much more satisfactorily than it can when positively-acting propelling devices are employed.

Another feature of advantage is this that because of the uniform cross-section of a power device similar to a cable I can quickly effect the engagement of the carriage therewith at any point desired, this being in contradistinction from the hooks or pins heretofore used adapted to engage with one or another link of a chain. If a chain of proper construction, particularly one having uniform dimensions, be substituted for the cable, it also can be gripped in substantially the way described at any required point.

By properly adjusting the cams or wedges 23, against which bear the toggle-arms 25, the gripping-bars 19 can be caused to act very delicately and more or less quickly upon the cable.

While my improvements are particularly applicable to the drawing of tubes, and I have herein illustrated them as applied to a mechanism designed for that work, yet I am aware that many of the features herein illustrated and described are applicable to the drawing of solid shafting, bars, &c.

I do not in this case claim, broadly, the novel features incident to the particular style of power device herein illustrated and described, preferring to present claims for that part of my invention in another application, Serial No. 571,476; nor do I herein claim, specifically, the novel features incident to the arrangement of the mandrel with relation to the die, the construction of the thrust-block or abutments for the outer end of the mandrel, and the construction of the mandrel itself, as illustrated in Figs. 11 to 16 herein, preferring to present claims for such features in another application, Serial No. 636,390.

What I claim is—

1. In a tube-drawing machine the combination of a bed, a carriage fitted to guides on the bed, power devices for moving the carriage, a mandrel secured at one end to the bed, a series of mandrel-holding arms pivotally connected to the bed and adapted to engage with the mandrel, and means for automatically moving said arms out of the path of the carriage as the latter is moved longitudinally of the bed and mandrel, substantially as set forth.

2. In a tube-drawing machine, the combination of a bed, a carriage, power devices for moving the carriage longitudinally of the bed, a mandrel connected to the bed at one end, auxiliary mandrel-supports mounted on the bed and adapted to bear laterally against the mandrel, and means for automatically moving said auxiliary mandrel-supports out of the path of the carriage, as the latter is moved longitudinally of the bed, substantially as and for the purpose set forth.

3. In a tube-drawing machine the combination of a bed, a carriage, power devices adapted to move the carriage on the bed, a mandrel, supports for the mandrel pivotally connected to the bed, means adapted to be actuated by the carriage for moving said supports out of contact with the mandrel as the carriage moves longitudinally of the bed, and means for returning each of said supports to its normal position after the carriage has passed the same, substantially as set forth.

4. In a tube-drawing machine the combination of a bed, a carriage, adapted to move longitudinally of the bed and provided with means for engaging the tube to be drawn, mandrel, supports pivoted to the bed and adapted to engage with the mandrel, fingers connected with said supports and projecting into the path of the carriage, and means for returning said supports to their normal position after the carriage has passed, substantially as set forth.

5. In a tube-drawing machine, the combination with a bed, and a stationary mandrel, of a series of lateral supports for the mandrel arranged on opposite sides of the bed, each support having a pivotally-mounted spring-pressed arm adapted to contact at one end with the mandrel, and a tube-gripper adapted to move longitudinally of the mandrel, substantially as set forth.

6. In a tube-drawing machine the combination with a bed and a stationary mandrel, of one or more lateral supports for the mandrel each comprising a horizontally-swinging arm provided at its free end with a socket or groove to receive the mandrel, and a spring for normally holding such arm in contact with the mandrel, and a longitudinally-movable tube-gripper arranged in the plane of said swinging arms, substantially as set forth.

7. In a tube-drawing machine the combination with a bed-frame, of a die stationarily secured to said bed-frame, a mandrel connected to one end of said frame and extending toward said stationary die, a series of horizontally-swinging arms, pivoted to the bed and adapted to engage with the mandrel at points between its supported end and the stationary die, and a longitudinally-movable tube-gripper, substantially as set forth.

8. In a draw-bench, the combination with a main frame, an endless traction device extending longitudinally thereof, and a die mounted on said frame, of a carriage mounted on the frame to move longitudinally thereof toward and from the die, and having jaws or plates, 19, on opposite sides of and extending parallel to the traction device, means for simultaneously moving said jaws laterally toward the traction device and longitudinally in the direction of movement of said device to cause said jaws to frictionally engage with the said traction device, and means for varying the movement of said jaws, substantially as set forth.

9. In a metal-drawing machine, the combination with a bed, and an endless driving-cable, of a die secured to said bed, a carriage having a base-frame fitted in guides on the bed, jaws mounted on said carriage, and adapted to engage with the metal to be drawn, cable-gripping plates supported on said carriage, toggle-links interposed between said plates and the frame of the carriage, and an operating-shaft adapted to engage with said plates, substantially as set forth.

10. In a draw-bench, the combination with a bed-frame, and a driving-cable, of a die supported on the bed, and a carriage consisting of a base-frame fitted in guides on the bed and provided with means for engaging the article to be drawn, and with the inwardly-extending cam-surfaces, 22, cable-gripping plates, links 25 having their ends fitted in sockets in said plates and in blocks, 23, contacting with the cams 22, and an operating-shaft for moving said gripping-plates, substantially as set forth.

11. In a draw-bench, the combination with a bed, a power-cable, and a die, of a carriage having means for engaging with the article to be drawn, the base-frame, 9ª, fitted in guides on the bed and provided with inwardly-extending cam-surfaces, 22, cam-blocks, 23, in contact with said cam-surfaces 22, cable-gripping plates, 19, links, 25, having their ends fitted in sockets in said gripping-plates and blocks, 23, an operating-shaft connected with said gripping-plates, and means for adjusting the blocks, 23, longitudinally of the base-frame, substantially as set forth.

12. In a draw-bench, the combination of a main frame, a die mounted on said frame, a carriage mounted on said frame and adapted to engage with the metal to be drawn, power devices for moving said carriage longitudinally of the bed, and a guide for the metal to be drawn consisting of a frame or support and two peripherally-grooved rollers or wheels mounted in said frame and forming a longitudinally-extending passage in line with the die, substantially as set forth.

13. In a draw-bench, the combination of a bed-frame, a die mounted on said frame, a carriage adapted to engage with the article to be drawn, and power devices for moving said carriage longitudinally of the bed, of a die for the article to be drawn consisting of a support extending transversely of the main or bed frame, and two horizontally-rotatable rollers mounted in said support and arranged to contact with the article to be drawn, substantially as set forth.

14. In a tube-drawing machine, the combination of an external die, a ball arranged within the die and rotatable in all directions, and a relative stationary device for preventing said ball from being carried through the die by the metal being drawn, substantially as set forth.

15. In a tube-drawing machine, a mandrel or die-carrier for the interior of a tube having a ball-support central with the longitudinal axis of the mandrel, and a ball rotatably mounted in the said support and having its center situated at the longitudinal axis of the mandrel, substantially as set forth.

16. In a draw-bench, the combination of a bed or support, a die, a cable, or endless traction device, driving devices having frictional engagement with said cable, a gripper, mounted on the bed and having a pair of jaws or clamps adapted to maintain the article to be drawn in line with the die, means for moving one of said jaws laterally toward and from the other, jaws or clamps mounted in said gripper in the plane of and adapted to have a frictional engagement with the said endless traction device, and means independent of those aforesaid, for simultaneously moving the last said jaws toward or from a position where they will frictionally engage with the cable, substantially as set forth.

17. In a draw-bench, the combination of a bed, a die stationarily supported on the bed, a power-cable, a movable gripper mounted on the bed at one side of the die, and having jaws adapted to engage the metal to be drawn, cable-clamping jaws mounted in said gripper, a rock-shaft having lugs or fingers 20ᵇ, adapted to engage said cable-jaws, means for rocking said shaft to move the said cable-jaws longitudinally, and means for simultaneously and automatically moving said jaws laterally, substantially as set forth.

18. The combination of the die, the movable traction device, the tube-carrier on the forward side of the die and adapted to exert a pulling action on the tube, the lever on the carrier for instantly connecting the carrier to, and disconnecting it from the tube, a lever on the carrier for instantly connecting it to and detaching it from the traction device, the mandrel for the interior of the tube, having its stem on the forward side of the die, and an abutment beyond the tube for the end of the stem, substantially as set forth.

19. The combination of the die, the movable traction device, the tube-carrier on the forward side of the die, and adapted to exert a pulling action on the tube, means detachably connecting the carrier to the traction device, the mandrel for the interior of the tube, having its stem on the forward side of the die, an abutment to take the endwise pressure of the stem, and movable abutments bearing laterally against the stem, substantially as set forth.

20. The combination of the stationary die, the movable traction device, the tube-carrier on the forward side of the die and adapted to exert a pulling action on the tube, means for detachably connecting the carrier to the traction device, a mandrel for the interior of the tube, having a stem extending beyond the tube, a bearing at the end of the stem, and movable abutments bearing laterally against the stem at points between the bearing and the die, substantially as set forth.

21. The combination of a die, the movable traction device, the tube-pulling carrier on one side of the die, the mandrel having its stem projecting from the die forward on the same side with the tube-pulling carrier, a tube-pushing carrier on the opposite side of the die and adapted to push the tube over the mandrel-head and onto the stem, and means for detachably connecting said tube-pushing carrier to the traction device, substantially as set forth.

22. In a tube-drawing apparatus, the combination of a die, a mandrel having one end within the die and a stem projecting beyond one side of the die, means for preventing longitudinal movement of the mandrel away from the die, a tube-carrier and pushing device arranged on the opposite side of the die from the mandrel-stem and adapted to move the tube to be drawn toward the die and mandrel, and to permit the tube to be moved longitudinally independent of any movement of said carrier, a supplemental tube guide or support on the same side of the die as said pushing-carrier, and a pulling-carrier arranged on the same side of the die as and adapted to travel longitudinally of the mandrel-stem, substantially as set forth.

In testimony whereof I affix my signature in presence of two witnesses.

WILLIAM A. McCOOL.

Witnesses:
JOHN W. CULMER,
JAMES F. MERRIMAN.